(12) United States Patent
Bigagli et al.

(10) Patent No.: US 7,340,654 B2
(45) Date of Patent: Mar. 4, 2008

(54) AUTONOMIC MONITORING IN A GRID ENVIRONMENT

(75) Inventors: David Bigagli, Toronto (CA); Xiaohui Wei, Chang Chun (CN)

(73) Assignee: Platform Computing Corporation, Markham, Ontario (CA)

(*) Notice: Subject to any disclaimer, the term of this patent is extended or adjusted under 35 U.S.C. 154(b) by 577 days.

(21) Appl. No.: 10/871,350

(22) Filed: Jun. 17, 2004

(65) Prior Publication Data

US 2005/0283788 A1    Dec. 22, 2005

(51) Int. Cl.
*G06F 11/00* (2006.01)
(52) U.S. Cl. .................................. 714/47; 709/224
(58) Field of Classification Search ............... 714/47
See application file for complete search history.

(56) References Cited

U.S. PATENT DOCUMENTS

| | | | |
|---|---|---|---|
| 3,648,253 A | 3/1972 | Mullery et al. | |
| 4,839,798 A | 6/1989 | Eguchi et al. | |
| 5,031,089 A | 7/1991 | Liu | |
| 5,428,781 A | 6/1995 | Duault et al. | |
| 5,442,791 A | 8/1995 | Wrabetz et al. | |
| 5,473,773 A | 12/1995 | Aman | |
| 5,504,894 A | 4/1996 | Ferguson et al. | |
| 5,522,070 A | 5/1996 | Sumimoto | |
| 5,603,029 A | 2/1997 | Aman et al. | |
| 5,621,663 A | 4/1997 | Skagerling | |
| 5,655,081 A | 8/1997 | Bonnell et al. | |
| 5,675,739 A | 10/1997 | Eilert et al. | |
| 5,805,785 A | 9/1998 | Dias et al. | |
| 5,812,844 A | 9/1998 | Jones et al. | |
| 5,872,931 A | 2/1999 | Chivaluri | |
| 5,893,905 A | 4/1999 | Main et al. | |
| 5,903,757 A | 5/1999 | Gretz et al. | |
| 5,978,829 A | 11/1999 | Chung et al. | |
| 6,195,676 B1 | 2/2001 | Spix et al. | |
| 6,230,183 B1 | 5/2001 | Yocom et al. | |
| 6,247,041 B1 | 6/2001 | Kruger et al. | |
| 6,263,358 B1 | 7/2001 | Lee et al. | |
| 6,282,561 B1 | 8/2001 | Jones et al. | |
| 6,334,193 B1 * | 12/2001 | Buzsaki | 714/2 |
| 6,353,844 B1 | 3/2002 | Bitar et al. | |
| 6,356,917 B1 | 3/2002 | Dempsey | |
| 6,393,455 B1 | 5/2002 | Eilert et al. | |

(Continued)

OTHER PUBLICATIONS

"Specifying and Monitoring Guarantees in Commercial Grids through SLA". HP Labs 2002 Technical Reports, Akil Sahai, Sven Graupner, Vijay Machiraju, and Aad Van Moorsel, Nov. 14, 2002.

(Continued)

*Primary Examiner*—Marc Duncan
(74) *Attorney, Agent, or Firm*—Baker & McKenzie LLP

(57) ABSTRACT

A system for performing autonomic monitoring in a computing grid is described. The system includes a plurality of modules, which when implemented into a computing grid, are operable to analyze objects of the grid and identify exception conditions associated with the objects. The system includes a configuration module for receiving information on specified objects to be monitored and exception conditions for the objects, an information collection module to collect job execution data associated with the objects, and an exception module to evaluate the job execution data associated with the objects and identify existing exception conditions. Related methods of performing autonomic monitoring in a grid system are also described.

30 Claims, 4 Drawing Sheets

U.S. PATENT DOCUMENTS

| | | | |
|---|---|---|---|
| 6,412,026 | B1 | 6/2002 | Graf |
| 6,463,454 | B1 | 10/2002 | Lumelsky et al. |
| 6,516,350 | B1 | 2/2003 | Lumelsky et al. |
| 6,643,614 | B2 | 11/2003 | Ding |
| 6,687,731 | B1 | 2/2004 | Kavak |
| 6,694,345 | B1 | 2/2004 | Brelsford et al. |
| 6,714,960 | B1 | 3/2004 | Bitar et al. |
| 6,728,961 | B1 | 4/2004 | Velasco |
| 7,043,659 | B1 * | 5/2006 | Klein et al. .................. 714/4 |
| 2003/0126260 | A1 | 7/2003 | Husain |
| 2003/0233602 | A1 | 12/2003 | Lindquist et al. |
| 2004/0019624 | A1 | 1/2004 | Sukegawa |
| 2004/0059966 | A1 | 3/2004 | Chan et al. |
| 2004/0064552 | A1 | 4/2004 | Chong |

OTHER PUBLICATIONS

"SLA-Driven Management of Distributed Systems Using the Common Information Model", IBM Research Report, Markus Debusmann and Alexander Keller, Aug. 16, 2002.

"Job-Scheduler Exceptions and Alarms", Chapter 4, Platform Job Scheduler User Guide, 2002.

"The Anatomy of the Grid: Enabling Scalable Virtual Organizations", International J. Supercomputer Applications, Ian Foster, Carl Kesselman, and Steven Tuecke, 2001.

"The Physiology of the Grid: An Open Grid Services Architecture for Distributed Systems Integration", Open Grid Service Infrastructure WG, Global Grid Forum, Ian Foster, Carl Kesselman, Jeffrey M. Nick, and Steven Tuecke, Jun. 22, 2002.

"SNAP: A Protocol for Negotiating Service Level Agreements and Coordinating Resource Managment in Distributed Systems", Lecture Notes in Computer Science, K.Czaikowski, I. Forster, C. Kesselman, V. Sander, and S. Tuecke, vol. 2537, pp. 153-183, 2002.

"Agreement-based Grid Service Management (OGSI-Agreement)", Global Grid Forum, K. Czajkowski, A. Dan, J. Rofrano, S. Tuecke, and M. Xu, Jun. 12, 2003.

http://www-unix.globus.org/developer/gram-architecture.html—GT3 Gram Architecture.

A. Mirtchovski, R. Simmonds, and R. Minnich, "Plan 9—An Intergrated Approach to Grid Computing", http://www.9grid.net/papers/ipdps-04/plan9-grid.pdf.

M. Jones, P. Leach, R. Draves and J. Barrera, "Support for user-centric modular real-time resource managment in the rialto operation system", in Proc. 5th Intl. Workshop on Network and Operating System Support for Digital Audio and Video, Durham, New Hampshire, pp. 55-66, Apr. 1995.

V. Berstis, "Fundamentals of Grid Computing", Redbooks Paper, IBM Corp. 2002. http://www.redbooks.ibm.com/redpapers/pdfs/redp3613.pdf.

International Preliminary Report on Patentability for PCT/IB2005/001717 dated Dec. 20, 2006.

Gabrielle Allen, David Anguio, Ian Foster, Gerd Lanfermann, Chuang Liu, Thomas Radke, Ed Seidel, & John Shall; "The Cactus Worm: Experiments with Dynamic Resource Discovery and Allocation in a Grid Environment" Max-Planck-Institut fur Gravitationsphysik, Albert-Einstein-Institut (AEI), 14476 Golm, Germany, Department of Computer Science. The University of Chicago, Chicago, IL 60657, USA, Mathematics and Computer Science Division, Argonne National Laboratory, Argonne, IL 60439, USA, Lawrence Berkely National Laboratory, Berkely, CA 94720, USA; pp. 1-14.

Abdulla Othman, Peter Dew, Karim Djemame, Iain Gourlay; "Adaptive Grid Resource Brokering"; Proceedings of the IEEE international Conference on Cluster Computer (CLUSTER '03); ® 2003 IEEE; pp. 1-8 http://www-{othman, dev, karim, iain}@comp.leeds.ac.uk.

Viktors Berstis; "Fundamentals of Grid Computing"; IBM Redbooks Paper; Copyright IBM Corp. 2002; pp. 1-28 http://www-ibm.com/redbooks.

International Search Report for PCT/IB2005/001717.

* cited by examiner

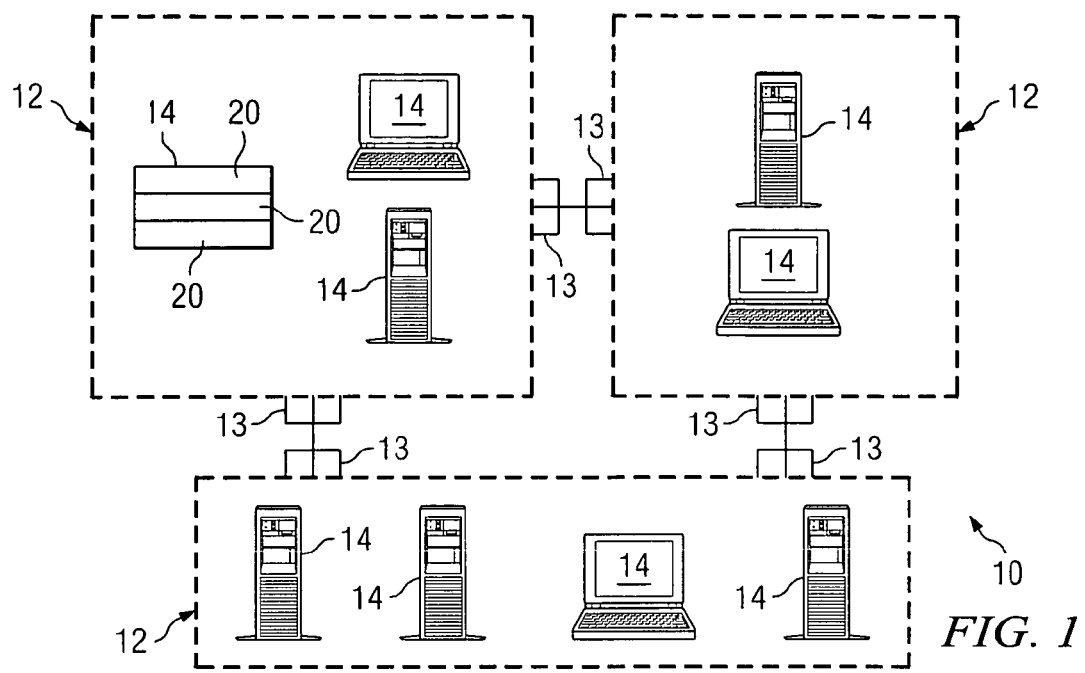
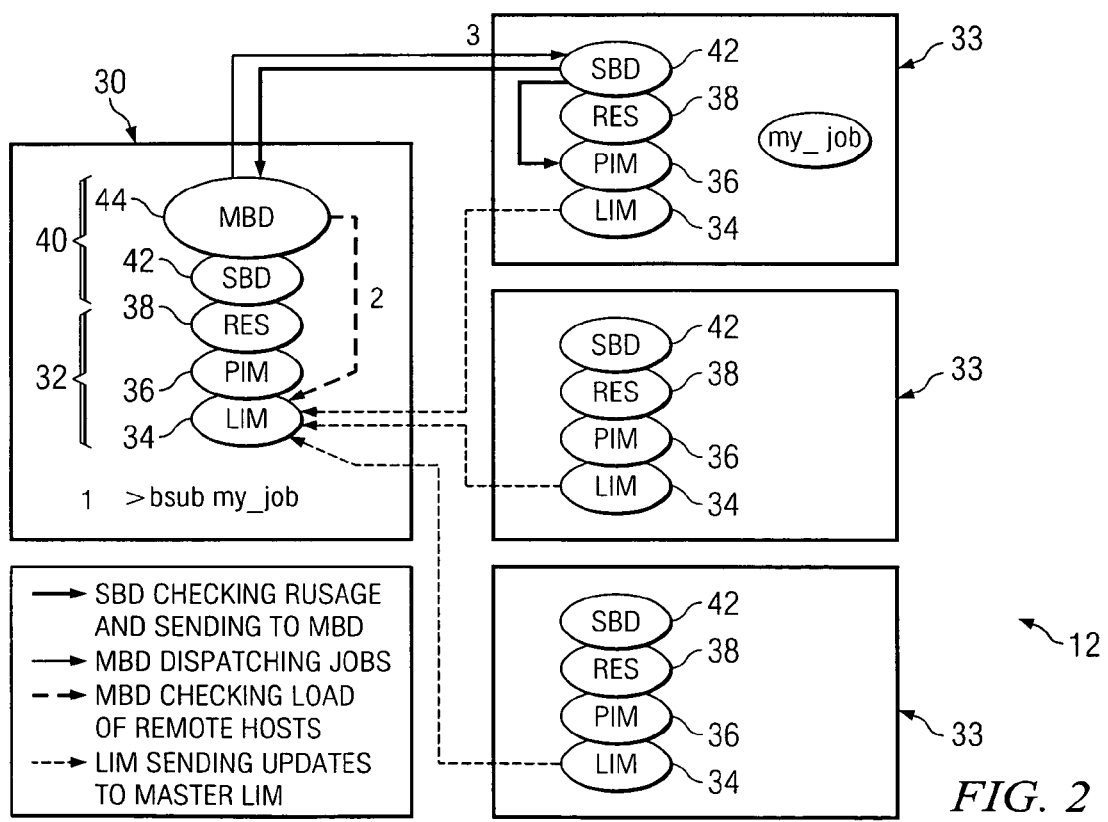
FIG. 1
FIG. 2

AUTONOMIC MONITORING IN A GRID ENVIRONMENT

CROSS-REFERENCE TO RELATED APPLICATIONS

This application is related to U.S. patent application Ser. No. 10/871,286, entitled "Job-Centric Scheduling in a Grid Environment" (Inventors: Bingfeng Lu, Jin Song Zhong, and Jason Lam), and U.S. patent application Ser. No. 10/871,502, entitled "Goal-Oriented Predictive Scheduling in a Grid Environment" (Inventors: David Bigagli, James Pang, and Shutao Yuan), each of which were filed on the same day as the present application and each of which are hereby incorporated by reference.

TECHNICAL FIELD

Disclosed embodiments herein relate generally to computing grid environments, and more particularly to improved systems and methods for monitoring electronic tasks in such environments.

BACKGROUND

The increasing complexity of electronic tasks (e.g. executable programs such as computational tasks, command execution, and data collection) has increased the demand for resources used in accomplishing such tasks. Resources include hardware that aids in completing electronic tasks, such as servers, clients, mainframe computers, networks, network storage, databases, memory, CPU time, and scientific instruments. Resources may also include software, available network services, and other non-hardware resources.

One response to the increased demand for resources has been the development of networked computing grid systems, which operate to integrate resources from otherwise independent grid participants. Computing grid systems generally include hardware and software infrastructure configured to form a virtual organization comprised of multiple resources in often geographically disperse locations.

Grid systems have become increasingly large and complex, often comprising thousands of machines executing hundreds of thousands of electronic tasks, or "jobs," on any given day. Managing such systems has become increasingly difficult, particularly identifying and correcting errors or "exception conditions" occurring within such systems. Further, providing appropriate levels of security for grid systems has grown more challenging as grids expand in size and complexity. Thus, manual procedures for managing grid systems are quickly becoming outdated.

Exception condition monitoring has previously been accomplished by monitoring the status of the machines or "hosts" providing the resources within the grid. More particularly, exception condition monitoring has typically involved analyzing attributes of the host such as the host's memory capacity, processing capabilities, and input/output, and evaluating whether the host is operating properly. Such exception condition monitoring can be problematic as it monitors the operation of the host instead of the status of the job being executed on the host. Thus, current exception condition monitoring techniques fail to identify exception conditions associated with jobs and job execution.

Therefore, improved systems and methods for automating functions associated with managing large-scale distributed computing grid systems is desired in which autonomic monitoring is provided to evaluate the execution of jobs on the grid and to correct such execution when exception conditions are detected.

BRIEF SUMMARY

Disclosed herein are autonomic monitoring systems for implementation into computing grid systems and related methods of performing autonomic monitoring in grid systems. In one exemplary embodiment, an autonomic monitoring system for deployment into a computing grid is described. The system monitors jobs being executed within the computing grid to identify exception conditions associated with the jobs. The system includes a configuration module, which selects the jobs to be monitored and defines the exception conditions for the jobs. The system further includes an information collection module, which monitors the jobs having exception conditions. Further provided is an exception module configured to analyze the jobs and identify the existence of exception conditions associated with the jobs.

In another embodiment, an action module is provided with the above-described configuration, information collection, and exception modules. The action module takes actions to correct the exception conditions identified for the jobs, such as closing the host running the job and/or notifying a system administrator of the problem.

In other embodiments, any combination of the above-described modules may be used in achieving autonomic monitoring within the computing grid.

In still further embodiments, related methods for performing autonomic monitoring in computing grid systems are described.

BRIEF DESCRIPTION OF THE DRAWINGS

Reference is now made to the following descriptions taken in conjunction with the accompanying drawings.

FIG. 1 illustrates a diagrammatic view of a grid system having a plurality of clusters according to one embodiment of the present disclosure;

FIG. 2 illustrates an architecture associated with the clusters of the grid system of FIG. 1;

DETAILED DESCRIPTION

Figure 3:
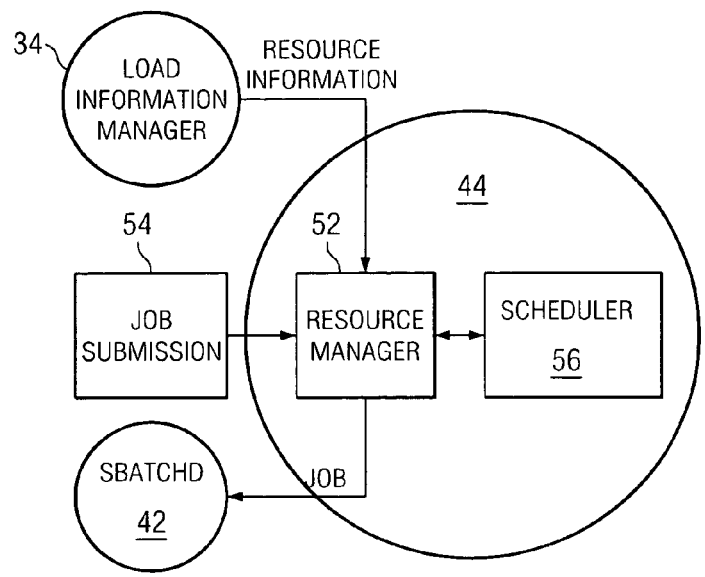
FIG. 3 illustrates processes associated with a component of the architecture of FIG. 2.

The present disclosure relates to autonomic monitoring systems and related methods that may be deployed into distributed resource management, or grid, systems. FIGS. 1-4 illustrate an exemplary grid architecture and associated software modules that enable grid participation, whereas the remaining figures disclose the autonomic monitoring systems and related methods of the present disclosure.

FIG. 1 illustrates a computing grid 10 having a plurality of clusters 12, which are configured to communicate with one another to share resources across the grid. The clusters 12 generally include a plurality of commonly linked machines, or "hosts" 14, which are enabled to provide resources such as CPU time, database storage, and computing capabilities. Each cluster 12 is typically protected by a firewall 13, which provides security for the networked hosts 14 within the cluster. A host 14 may be any machine capable of providing resources, such as a personal computer (PC), a server, or other computing device known in the art. Resources on a particular host 14 may be divided into slots 20, which generally refer to certain amounts of electronic task capacity available on the host 14. By breaking down the task capacity into slots 20, the scalability of the grid 10 can be increased, thereby increasing the resources available on the grid.

Grid systems, such as the grid 10, are typically built by configuring each cluster 12 to facilitate resource sharing on the grid. Such configuration may occur by loading grid-enabling software onto the hosts 14 or other devices associated with the clusters 12. In doing so, the operating system services provided by the hosts 14 are extended to create a single system image for the cluster 12. The grid-enabling software of the present disclosure may be in the form of simple object access protocol (SOAP/XML protocol) and may be configured to support operating systems such as Linux®, Windows® and Unix® by deploying software daemons that run on the preexisting operating systems provided for the cluster 12. The grid-enabling software may be broken down into various software modules, which include various processes for facilitating operation of the grid 10.

Referring now to FIG. 2, within the cluster 12 the grid-enabling software may be initially loaded onto a master host 30 selected for the cluster 12. The master host 30 may be a selected host 14 associated with the cluster 12, and is typically the host associated with an administrator of the cluster (hereinafter "system administrator"). The software may be built in layers, beginning with a base system 32. The base system 32 generally provides dynamic load balancing and transparent access to resources available within the cluster 12. The base system 32 includes a load information manager (LIM) component 34, which collects resource information from slave hosts 33 within the cluster 12 as will be further described. As with the master host 30, the slave hosts 33 may be any hosts 14 within the cluster 12. The base system 32 further includes a process information manager (PIM) component 36, which gathers process information such as configuration data. Upon startup, the load information manager 34 may read configuration data compiled on the process information manager 36. The base system 32 also includes a remote execution server (RES) 38, which is responsible for executing jobs remotely and transparently within the cluster 12.

A batch system 40 is then loaded as a layer on top of the base system 32, and includes a slave batch daemon 42 and a master batch daemon 44. The slave batch daemon 42 includes processes for receiving and processing instructions provided by the master batch daemon 44. The master batch daemon 44 is a level higher than the slave batch daemon 42, and is configured to manage not only the slave batch daemon 42 of the master host 30, but each of the slave batch daemons associated with the plurality of slave hosts 33. Although only three slave hosts 33 are shown, the number of hosts associated with the cluster 12 can vary considerably.

Grid-enabling software is also deployed onto the slave hosts 33 to facilitate resource sharing on the grid 10. In particular, the base system 32 of the grid software is loaded onto the slave hosts 33. As such, the slave hosts 33 are configured with their own load information managers 34, process information managers 36 and remote execution servers 38. Additionally, the slave hosts 33 are provided with their own slave batch daemons 42, which receive instructions from the master batch daemon 44 and facilitate the execution of the jobs (via the remote execution server 38) that are sent to the particular hosts.

Upon installation, the master batch daemon 44 can check the configuration of the cluster 12 and contact each of the slave batch daemons 42 of the slave hosts 33 to initiate host updates to the load information manager 34 of the master host 30. The host updates may be provided by the load information managers 34 of the slave hosts 33 and sent to the load information manager 34 of the master host 30, thereby aggregating resource data for the cluster 12. If a job is submitted to the master host 30, the master host can analyze the resource data for the cluster 12, and dispatch the job to a particular slave host 33 if the load information corresponds to the requirements of the job. Additionally, the slave batch daemons 42 of the slave hosts 33 can check resource usage for the slave hosts 33 and send such information to the master batch daemon 44 of the master host 30.

Referring now to FIG. 3, the master batch daemon 44 includes processes for generally functioning as a cluster workload, or resource, manager 52. For example, the resource manager 52 may allocate the collection of resources associated with the cluster 12 and match such resources with the resource requirements associated with a particular job to be executed on the grid 10. Accordingly, the resource manager 52 implemented within the master batch daemon 44 can receive job submissions 54 and transmit such jobs to slave batch daemons 42, which execute the jobs. In this manner, the master batch daemon 44 effectively enforces scheduling policies associated with the grid 10 as will be further described. Scheduling policies are typically driven by the requirements of particular jobs to be executed on the grid 10.

In some embodiments, a scheduler 56 is associated with the master batch daemon 44 and is configured to facilitate job scheduling within the cluster 12. In particular, the scheduler 56 may process the job submission 54 to evaluate the job's resource requirements, analyze the job's resource requirements against the resources provided by the hosts 14 within the cluster 12, and schedule the job to a compatible host or hosts. As discussed above, the amount and type of resources provided by the individual hosts 14 within the cluster 12 may be determined by the submission of such data from the load information managers 34 associated with the hosts. In other embodiments, the scheduler 56 may assign a job to a host 14 within the cluster 12 according to a scheduling decision made by the job or according to specified goal requirements of the job.

Various plug-in components may be provided as part of the scheduler 56. For example, reservation, parallel, and user-defined components may be provided as plug-in components to generally aid the scheduler 56 in making job-scheduling decisions. Various other plug-in components are contemplated as being provided with the scheduler 56.

Figure 4:
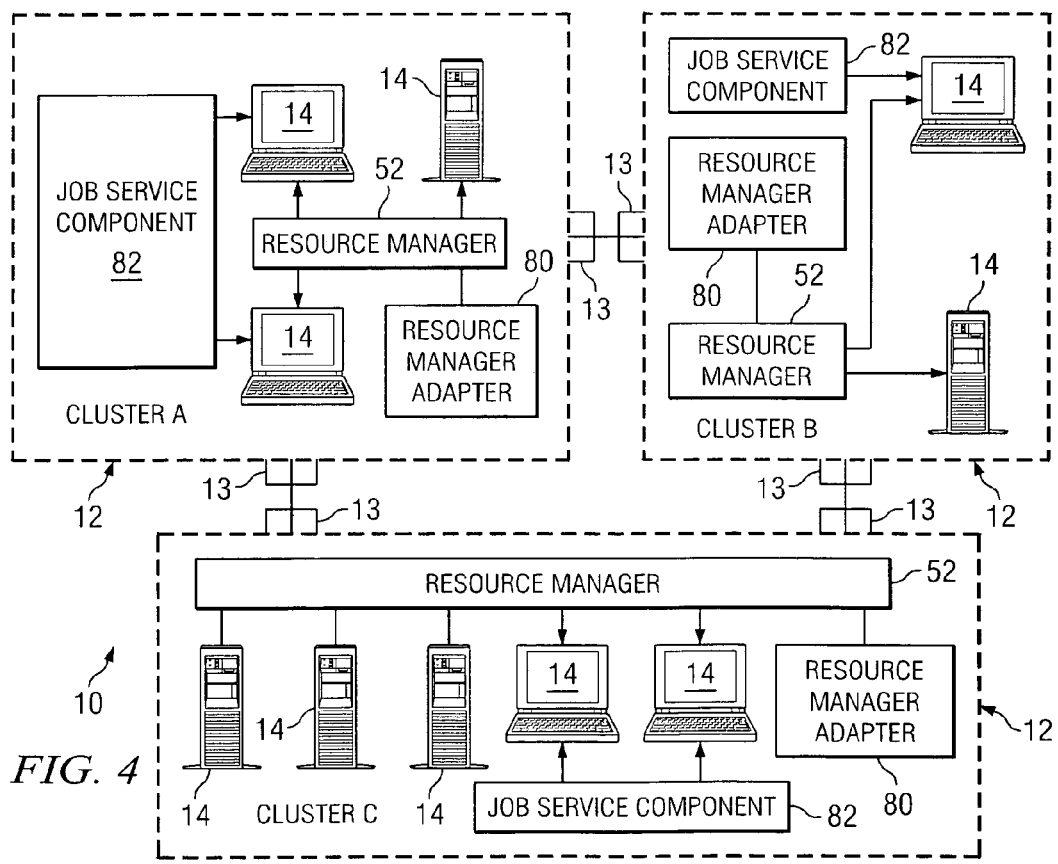
FIG. 4 illustrates a modified diagrammatic view of the grid system of FIG. 1.

Referring to FIG. 4, the hosts 14 and the resource managers 52 are shown in their associated clusters 12. Each cluster 12 may further include a resource manager adapter 80, which can be deployed into the grid 10 to enable communication between the various clusters associated with the grid 10. For example, the resource manager adapter 80 may comprise a Java® application programming interface (API) and a simple object access protocol (SOAP) interface to allow for cross-cluster communication.

A job service component 82 is further provided with each cluster 12 to generally provide an interface for inputting jobs into the grid. The job service component 82 comprises software processes configured to receive input from an end-user and create a job based on the end-user's request. The job service component 82 may be deployed onto any machine associated with the grid 10, such as an end-user's PC. The grid 10 may include one or several job service components 82, depending on the particular parameters of the system. In some embodiments, jobs input into the grid 10 will have predetermined resource requirements, e.g., 2 Linux® servers with over 2 gigabytes of memory, and thus the jobs will need to be executed on the grid according to these resource requirements. If a job is to be executed on a particular cluster 12, the job can be sent to the resource manager 52, which can then schedule the job accordingly.

The resource managers 52 may be configured to autonomously respond to errors occurring during job execution on the grid 10. Errors, which are often referred to as "exceptions" or "exception conditions," are abnormal behaviors associated with objects in the cluster 12. Objects may be hosts within the clusters 12, job queues associated with the hosts, and/or jobs being executed within the clusters. In the past, system administrators have typically been tasked with monitoring and responding to exceptions that occur within the clusters 12. However, according to the principles of the present disclosure, system administrators may delegate authority to the resource managers 52 by specifying the objects to be monitored, defining the exception conditions for each object, and defining the response to each exception condition. Accordingly, the objects effectively become autonomic objects, and thus exception conditions for the objects are automatically detected.

Figure 5:
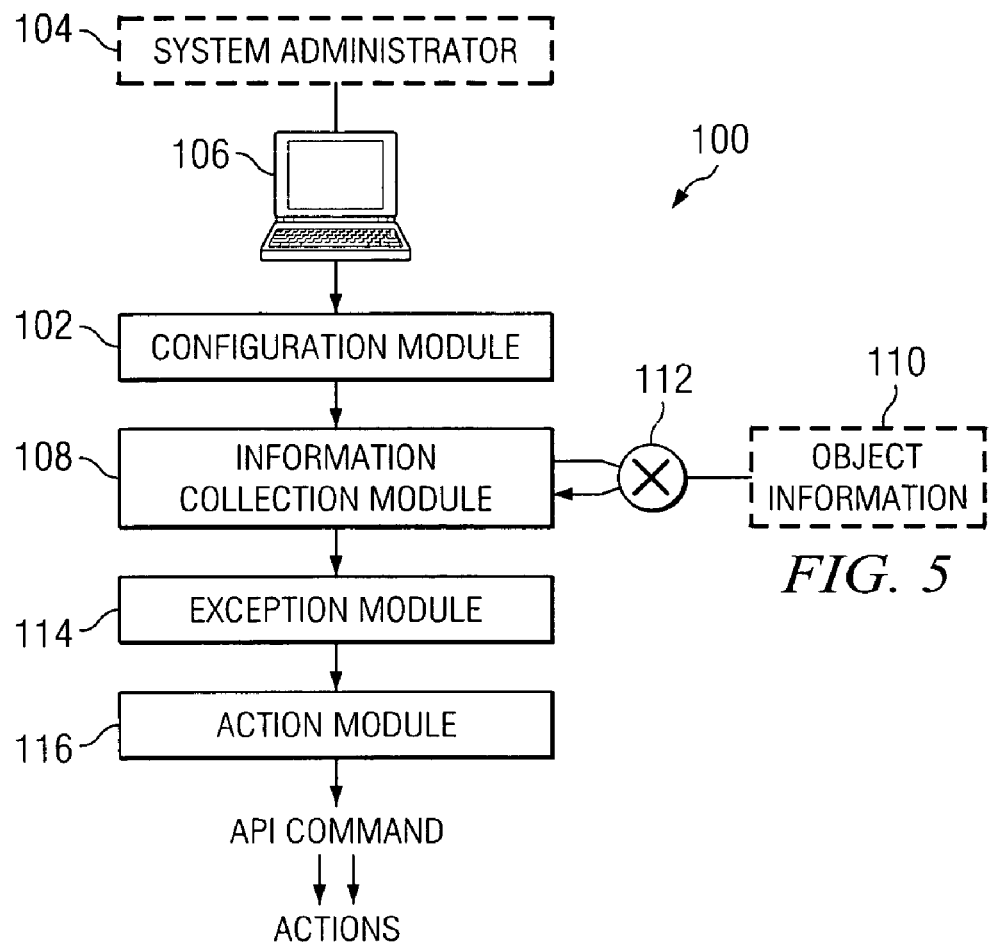
FIG. 5 illustrates a diagrammatic view of the autonomic monitoring system incorporated into the grid of FIG. 4.

FIG. 5 illustrates a system 100 for implementing autonomic exception monitoring into grid systems. The system 100 is represented as including several modules, or components, which may be implemented into the grid 10 as programming abstractions in a software format. The system 100 is typically installed into one or several resource managers 52 (FIG. 4) and therefore operates through one or several master batch daemons 44 (FIG. 3) associated with the grid 10. However, the system 100 may be deployed into any compatible portion of the grid 10 or several portions of the grid. The various software modules associated with the system 100 generally constitute part of the larger grid architecture 10, and are therefore configured to support interoperability of the resource managers 52 and/or clusters 12 of the grid.

The system 100 includes a configuration module 102, which, in one example, is accessed by a system administrator 104 through a PC 106 connected to the grid 10 and communicatively linked with one of the resource managers 52. The PC 106 may or may not also be configured as one of the hosts 14 of the grid 10. The system administrator 104 may specify the objects to be monitored and define the exception conditions for the objects by inputting such information into the configuration module 102. The configuration module 102 is able to parse the relevant information provided by the system administrator.

The system administrator 104 may define the exception conditions as Boolean expressions and may further break the exception conditions into various object groups, such as job exceptions and host exceptions. However, as will be further described with regard to the following examples, the object groups such as job exceptions and host exceptions may be evaluated in view of job execution.

In some embodiments, job exceptions may be specified at the queue level, i.e. prior to execution on one of the plurality of hosts 14. Queues may be defined at the global or grid level, and thus the queue could be defined for all the hosts 14 associated with the grid 10. However, queues may also be cluster-specific, and therefore, be associated with the hosts 14 of a particular cluster 12. If exceptions are defined for a queue, then jobs belonging to that queue may be subject to autonomic monitoring for the defined exceptions.

In one example, execution of a job may be evaluated by defining exceptions associated with the run time T(j) of a job, such as "Job J". In evaluating Job J's run time T(j), it may be pertinent to evaluate the Job J's CPU time over run time, which indicates Job J's CPU consumption. Moreover, the minimum expected run time $T_{min}$, the maximum expected job run time $T_{max}$, and the minimum expected CPU consumption $P_{min}$ of Job J might also be defined. Accordingly, if Job J runs for too short an amount of time, the job exception can be defined as $T(j)<T_{min}$. Similarly, if Job J runs for too long an amount of time, the job exception can be defined as $T(j)>T_{max}$. Still further, if Job J consumes too little an amount of CPU time, the job exception will be defined as $P(j)<P_{min}$.

Exceptions may be further defined for individual hosts within the clusters 12 by evaluating job execution on the hosts. A host experiencing an exception condition can be detrimental to the grid 10 because jobs running on the host may exit the host abnormally. Such errors can cause significant drain on resources associated with the grid 10. In some embodiments, host exceptions can be configured to close hosts automatically and send a notification to the system administrator 104, such as via email or by page. In one example, a host exception for a particular host ("h") is dependent on the number of jobs that exit abnormally within the last minute ("E(t)") at a particular time ("t"). The host exception will be further dependent on the current time ("T(c)").

The host exception may also be dependent upon parameters defined by the system administrator 104. For example, parameters such as the minimum duration ("D") that the exceptional situation should exist for host h before the system issues an exception and the maximum number ("$N_{max}$") of abnormally exited jobs in one minute on host h when the host is operating correctly may also help define a host exception. According to the above parameters, a host exception can be defined as follows:

$$\Psi(t)|_{t<Tc,\ t>Tc-D}:E(t)>N_{max}.$$

The parameters D and $N_{max}$ can be defined differently for different hosts, thereby allowing the system administrator 104 to tailor the host exception for specific hosts.

An information collection module 108 is communicatively linked with the configuration module 102 to receive the relevant exception condition information defined by the system administrator 104. The information collection module 108 generally monitors the running cluster 12 in real time and collects status information 110 on the autonomic objects, which are those objects specified and defined to have exception conditions. The information collection module 108 may include an information filter 112, which filters out information unrelated to the specified autonomic objects. For example, the information filter 112 may evaluate data according to the exception definitions, and based on the analysis, pass through or filter out such data. Although described as a sub-component of the information collection module 108, the information filter 112 may be a stand-alone component.

The information collection module 108 may evaluate the relevant data by examining the variables associated with each defined exception condition. For instance, an administrator may define the following two exceptions for a job ("Job A"):

(1) $T(a)<T_{min}$ (Job A's run time is less than the defined minimum); and (2) $P(a)<P_{min}$ (Job A consumes less than the configured minimum CPU time).

The variables associated with the above exception conditions include T(a) and P(a), and thus, the information collection module 108 may collect data to define these variables. Generally, the information collection module 108 should collect the values of the variables for all exception conditions associated with a particular autonomic object ("Object X"), e.g. the relevant data C(x). In the above example, the relevant data for Job A can be defined as follows:

$$C(a)=\{T(a), P(a)\}.$$

If there are a certain number of autonomic objects ("n") defined for the system 100, then the relevant data ("d") to be collected by the information collection module 108 may be represented by $$d=\Sigma_{x=1-n}C(x).$$

The information collection module 108 transmits the relevant data d to an exception module 114, which identifies exceptions that should be corrected. In some embodiments, the exception module 114 evaluates the above-described Boolean expressions associated with the data received from the information collection module 108 to determine whether an exception should be identified and corrected. For example, if the Boolean expressions evaluate to TRUE, then the exception module 108 can mark the exception for correction.

The system 100 further includes an action module 116, which is configured to take actions to handle the exceptions identified by the exception module 114. The action module 116 may be invoked periodically, particularly if there has been an above-average amount of exceptions identified recently. The actions associated with the action module 116 may be configured as IF-THEN rules that include default actions for each defined exception. In some instances, the system administrator 104 may define actions that override the default actions. The actions are typically implemented by user commands or API calls. For example, if a job runs over the time allotted for completion of the job, the action may be configured as follows:

```
IF
    Job run overtime exception
THEN
    Kill the job
END IF.
```

Moreover, if a job uses an insufficient amount of CPU time consumption, the action may be configured as follows:

```
IF
    Job uses too little CPU time exception
THEN
    Send a notification to the administrator
ENDIF.
```

Figure 6:
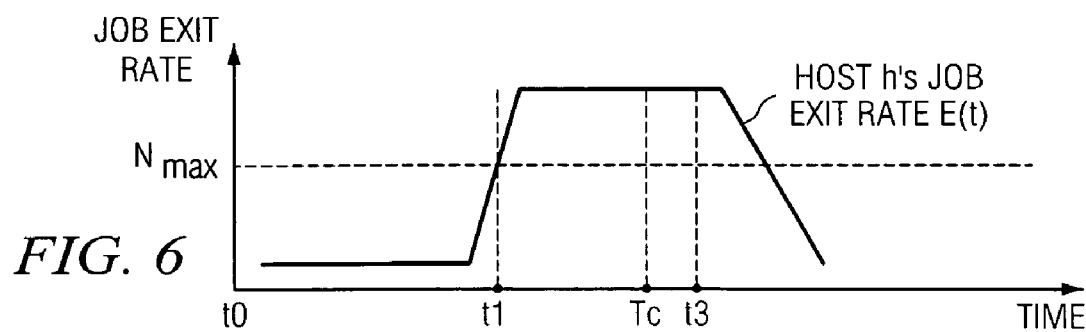
FIG. 6 is a graphical view depicting a host exception, which may be detected by the autonomic monitoring system of FIG. 5.

By way of example, it may be desired that host h be monitored for exception conditions. Referring to FIG. 6, a graphical illustration depicts the monitoring of host h and the events leading up to the system 100 identifying an exception. More particularly, the job exit rate E(t) associated with the host h is plotted from an initial time period t0 and evaluated against a threshold $N_{max}$ which as described above, refers to the configured maximum number of abnormally exited jobs per minute permitted by the system 100. Thus, should the rate of abnormally exited jobs rise above the threshold $N_{max}$ for a period of time exceeding a configured minimum time duration D, the exception module 114 will identify an exception. In this example, t1 represents the time at which the abnormally exited job rate exceeds $N_{max}$ and Tc represents the current time, which is continually plugged into the host exception definition until Tc−t1>=D and E(t) remains larger than $N_{max}$. Thus, when these conditions are met, the exception module 114 will identify an exception (shown in this example as occurring at time t3) and invoke an action module 116 associated with the system 100 to take corrective action. Upon corrective action being taken, the abnormally exited job rate should drop below the configured threshold $N_{max}$ to ensure that the host h is running properly.

The autonomic objects according to the present disclosure are not necessarily confined to having only one exception condition. Rather, an autonomic object may have multiple exception conditions, which may cause the exception module 114 to identify multiple exceptions for an object. Accordingly, the action module 116 may function to combine actions for the multiple exceptions, or possibly resolve conflicts between the multiple exceptions. In some embodiments, the action module 116 is designed as a plug-in component, which end-users can use to customize the default actions associated with the action module. Moreover, the end-user may design their own action module 116 for use with the system 100.

Figure 7:
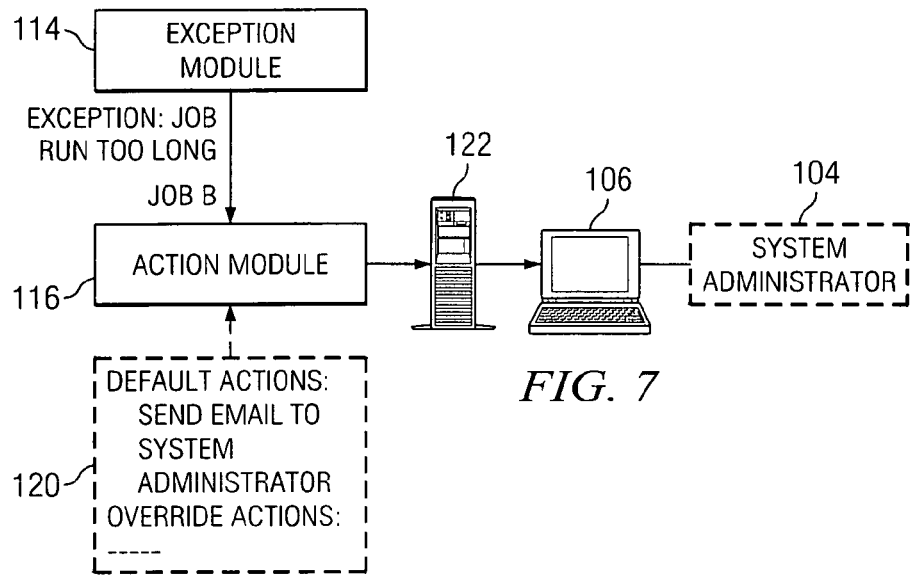
FIG. 7 illustrates a diagrammatic view of a job exception and the associated response to the job exception.

Referring to FIG. 7, in one example, the exception module 114 may be monitoring a job ("Job B") for a defined job exception, such as whether the job is running too long ($T(b)>T_{max}$). Should an exception arise, the action module 116 has a default action 120 of "send email to system administrator." Additionally, no overriding actions have been defined for the action module 116. Thus, upon recognition of the exception, i.e. $T(b)>T_{max}$, the exception module 114 will identify an exception, thereby causing the action module 116 to send an email notification to the system administrator 104 through a mail server 122. The system administrator 104 can access the email notification via the PC 106.

Figure 8:
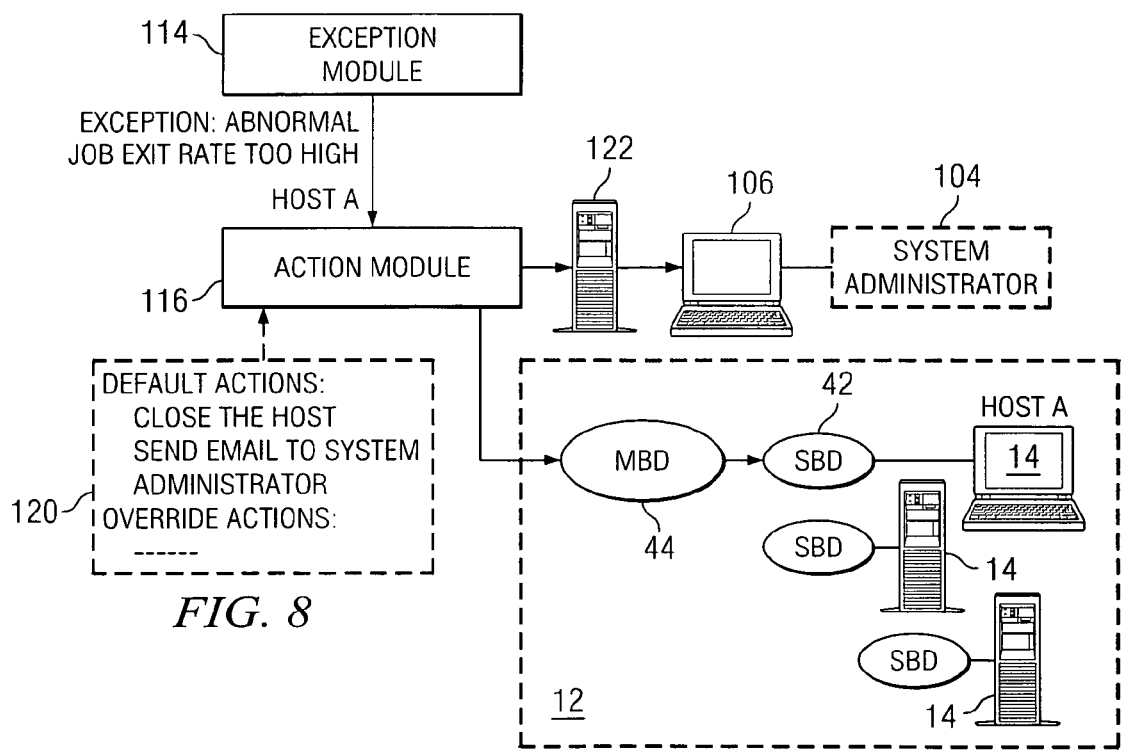
FIG. 8 illustrates a diagrammatic view of a host exception and the associated response to the host exception.

Referring to FIG. 8, in another example, the exception module 114 may be monitoring a host ("Host A") for a defined host exception, such as whether the abnormal job exit rate for Host A is too high ($E(t)>N_{max}$). Default actions 120 for this exception have been defined in the action module 116 as "close the host" and "send email to system administrator." No overriding actions have been defined for the action trigger module 116. Thus, upon recognition of the exception, the exception module 114 will identify an exception, which will cause the action module 116 to initiate closure of Host A. In this example, the cluster 12 associated with Host A is different from the cluster onto which the autonomic monitoring system 100 has been deployed. Thus, the action module 116 may ask the cluster 12 associated with Host A to close Host A with a host close command. Accordingly, the master batch daemon 44 of the cluster 12 will accept the command and send a host close control request to the slave batch daemon 42 associated with Host A. After closure of Host A, the action module 116 will then notify the system administrator 104 of the exception condition and closure of Host A by sending an email to the system administrator through the mail server 122 and the system administrator's PC 106.

While various embodiments of systems for performing autonomic monitoring in a grid environment according to the principles disclosed herein, and related methods of performing autonomic monitoring, have been described above, it should be understood that they have been presented by way of example only, and not limitation. For example, although the hosts have been generally indicated as PCs and servers, various other types of hosts are contemplated as providing resources for the grid 10. Exception notification may be through one or more different techniques, such as by email, wireless paging, web dashboard monitoring, webpage updates, or other notification technique. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method for performing autonomic monitoring of jobs in a networked computing grid in order to determine problem conditions in the grid hardware or grid-enabling software operation, the method comprising:

defining one or more exception conditions for a plurality of jobs being executed on one or more hosts within the grid, the exception conditions being indicative of problem conditions in the grid hardware or grid-enabling software operation;

collecting status information on the plurality of jobs during their execution;

evaluating the collected job status information to determine whether an exception condition exists that is indicative of a problem condition in the grid hardware or grid-enabling software operation; and acting to correct the problem condition of the grid hardware or grid-enabling software operation that was indicated by the exception condition, wherein at least one of the one or more exception conditions is specified relative to a queue level.

2. The method of claim 1 wherein the at least one of the one or more exception conditions is specified relative to a cluster-specific queue level.

3. A method for performing autonomic monitoring of jobs in a networked computing grid in order to determine problem conditions in the grid hardware or grid-enabling software operation, the method comprising:

defining one or more exception conditions for a plurality of jobs being executed on one or more hosts within the grid, the exception conditions being indicative of problem conditions in the grid hardware or grid-enabling software operation;

collecting status information on the plurality of jobs during their execution;

evaluating the collected job status information to determine whether an exception condition exists that is indicative of a problem condition in the grid hardware or grid-enabling software operation; and acting to correct the problem condition of the grid hardware or grid-enabling software operation that was indicated by the exception condition, wherein at least one of the one or more exception conditions is specified relative to job execution time.

4. A method for performing autonomic monitoring of jobs in a networked computing grid in order to determine problem conditions in the grid hardware or grid-enabling software operation, the method comprising:

defining one or more exception conditions for a plurality of jobs being executed on one or more hosts within the grid, the exception conditions being indicative of problem conditions in the grid hardware or grid-enabling software operation;

collecting status information on the plurality of jobs during their execution;

evaluating the collected job status information to determine whether an exception condition exists that is indicative of a problem condition in the grid hardware or grid-enabling software operation; and acting to correct the problem condition of the grid hardware or grid-enabling software operation that was indicated by the exception condition, wherein at least one of the one or more exception conditions is selected from the group consisting of minimum expected job run time, maximum expected job run time, and minimum expected CPU consumption.

5. A method for performing autonomic monitoring of jobs in a networked computing grid in order to determine problem conditions in the grid hardware or grid-enabling software operation, the method comprising:

defining one or more exception conditions for a plurality of jobs being executed on one or more hosts within the grid, the exception conditions being indicative of problem conditions in the grid hardware or grid-enabling software operation;

collecting status information on the plurality of jobs during their execution;

evaluating the collected job status information to determine whether an exception condition exists that is indicative of a problem condition in the grid hardware or grid-enabling software operation; and acting to correct the problem condition of the grid hardware or grid-enabling software operation that was indicated by the exception condition, wherein at least one of the one or more exception conditions is specified relative to an individual host.

6. The method of claim 5 wherein the at least one of the one or more exception conditions is specified based on the number of jobs that exit abnormally within a certain time for a particular host.

7. The method of claim 5 wherein the at least one of the one or more exception conditions is specified based on the minimum duration that an exceptional condition should exist for a particular host.

8. The method of claim 5 wherein multiple exception conditions can be differently defined for different hosts within the networked computing grid.

9. A method for performing autonomic monitoring of jobs in a networked computing grid in order to determine problem conditions in the grid hardware or grid-enabling software operation, the method comprising:

specifying a plurality of objects to be monitored, the specified objects comprising job queues and/or hosts within the networked computing grid;

defining one or more exception conditions for the plurality of objects, the defined exception conditions being indicative of problem conditions in at least some of the plurality of objects being monitored;

defining a response to each defined exception condition, whereby each of the specified plurality of objects, together with its one or more defined exception conditions and defined responses to the exception conditions, comprises an autonomic object within the networked computing grid;

collecting values of the variables for the exception conditions associated with one or more of the autonomic objects within the networked computing grid;

evaluating the collected variable values to determine whether at least one exception condition exists that is indicative of a problem condition in the autonomic object; and acting to correct the problem condition of the autonomic object that was indicated by the at least one exception condition.

10. The method of claim 9 wherein the acting to correct the problem condition comprises closing one or more hosts that are associated with the autonomic object.

11. The method of claim 9 wherein the acting to correct the problem condition comprises notifying a system administrator of the existence of the exception condition.

12. The method of claim 9 wherein the at least one exception conditions is specified relative to a queue level.

13. The method of claim 12 wherein the at least one exception condition is specified relative to a cluster-specific queue level.

14. The method of claim 9 wherein the at least one exception condition is specified relative to job execution time.

15. The method of claim 9 wherein the at least one exception condition is selected from the group consisting of minimum expected job run time, maximum expected job run time, and minimum expected CPU consumption.

16. The method of claim 9 wherein the at least one exception condition is specified relative to an individual host.

17. The method of claim 16 wherein the at least one exception condition is specified based on the number of jobs that exit abnormally within a certain time for a particular host.

18. The method of claim 16 wherein the at least one exception condition is specified based on a minimum duration that an exception condition should exist for a particular host.

19. The method of claim 16 wherein multiple exception conditions can be differently defined for different hosts within the networked computing grid.

20. A system for performing autonomic monitoring of objects in a networked computing grid having a plurality of resources for executing a plurality of jobs, the autonomic monitoring operable to detect problem conditions in the grid hardware or grid-enabling software operation in the networked computing grid, the system comprising:

a configuration module for receiving information on one or more objects to be monitored, for defining exception conditions for the one or more objects, the exception conditions being indicative of problem conditions in the grid hardware or grid-enabling software operation in the networked computing grid, and for defining responses to be taken to each defined exception condition, whereby each of the specified plurality of objects with its one or more defined exception conditions and defined responses to the exception conditions comprises an autonomic object within the networked computing grid;

an information collection module in communication with the configuration module, the information collection module operable to collect values of the variables for the exception conditions associated with one or more of the autonomic objects defined through the configuration module;

an exception module in communication with the information collection module and the configuration module, the exception module being operable to identify the existence of the one or more exception conditions for the autonomic objects defined through the configuration module by evaluating the variables for the exception conditions collected through the information collection module; and an action module in communication with the exception module, the action module being operable to invoke actions to correct the to correct the problem condition of the grid hardware or grid-enabling software operation that was indicated by the exception condition.

21. The system of claim 20 wherein the actions invoked by the action module comprise closing one or more hosts associated with the autonomic object.

22. The system of claim 20 wherein the actions invoked by the action module comprise notifying a system administrator of the existence of an exception condition.

23. The system of claim 20 wherein at least one of the defined exception conditions is specified relative to a queue level.

24. The system of claim 23 wherein at least one of the defined exception conditions is specified relative to a cluster-specific queue level.

25. The system of claim 20 wherein at least one of the defined exception conditions is specified relative to job execution time.

26. The system of claim 20 wherein at least one of the defined exception conditions is selected from the group consisting of minimum expected job run time, maximum expected job run time, and minimum expected CPU consumption.

27. The system of claim 20 wherein at least one of the defined exception conditions is specified relative to an individual host.

28. The system of claim 27 wherein the at least one exception condition is specified based on the number of jobs that exit abnormally within a certain time for the individual host.

29. The system of claim 27 wherein the at least one exception condition is specified based on the minimum duration that an exceptional condition should exist for the individual host.

30. The system of claim 20 wherein multiple exception conditions can be differently defined for different hosts within the networked computing grid.

* * * * *